C. S. KINNEY.
APPARATUS FOR TIMING AND REMOVING EGGS FROM BOILERS.
APPLICATION FILED AUG. 6, 1909.

963,050.

Patented July 5, 1910.

2 SHEETS—SHEET 1.

Attest.
H. G. Fletcher.
E. L. Wallace.

Inventor.
Charles S. Kinney.
By Higdon & Longan.
Attys.

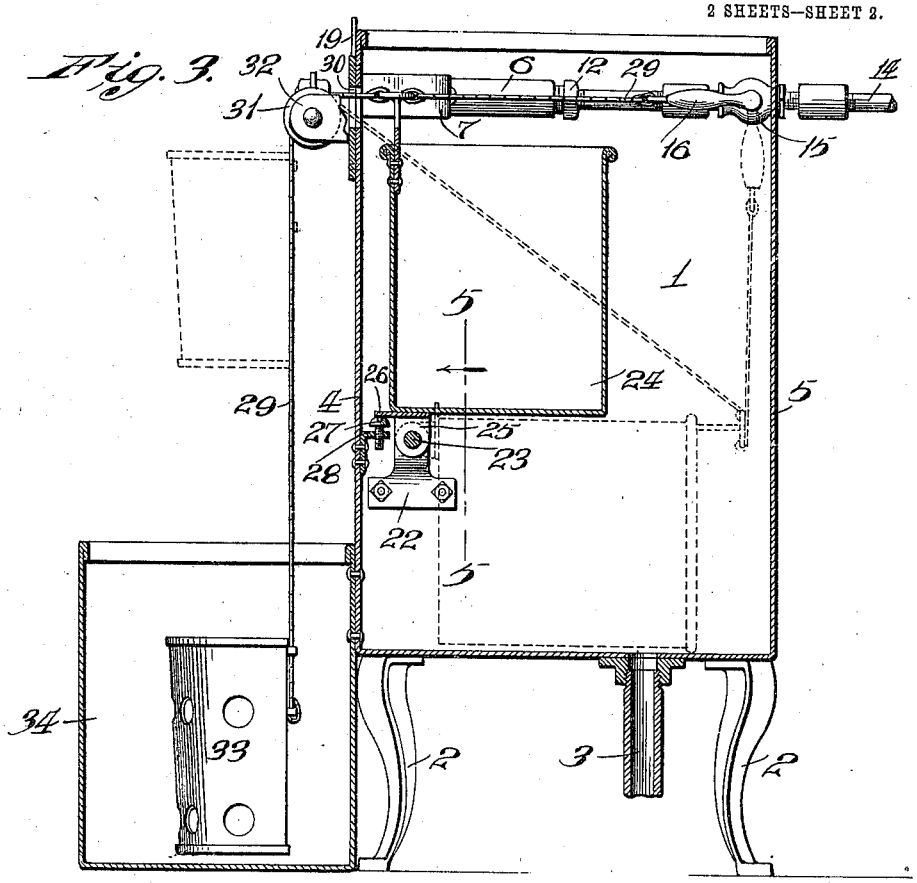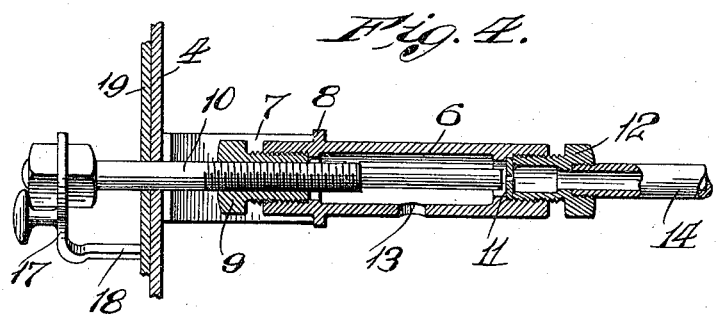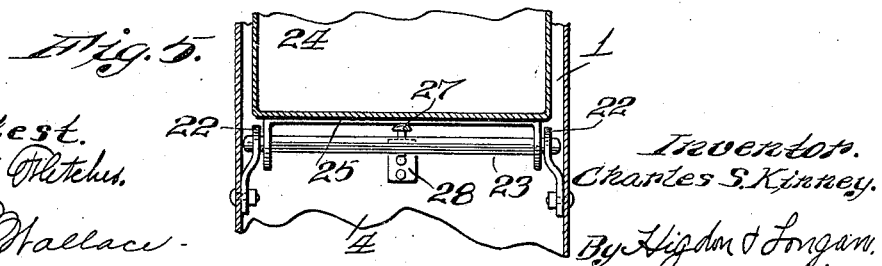

UNITED STATES PATENT OFFICE.

CHARLES S. KINNEY, OF ST. LOUIS, MISSOURI.

APPARATUS FOR TIMING AND REMOVING EGGS FROM BOILERS.

963,050.   Specification of Letters Patent.   Patented July 5, 1910.

Application filed August 6, 1909. Serial No. 511,592.

*To all whom it may concern:*

Be it known that I, CHARLES S. KINNEY, a citizen of the United States, and resident of St. Louis, Missouri, have invented certain new and useful Improvements in Apparatus for Timing and Removing Eggs from Boilers, of which the following is a specification containing a full, clear, and exact description, reference being had to the accompanying drawings, forming a part hereof.

My invention relates to an apparatus for automatically removing eggs from a body of boiling water at certain various predetermined times, the object of my invention being to construct fluid operated timing and removing devices in an apparatus of this class.

Figure 1:
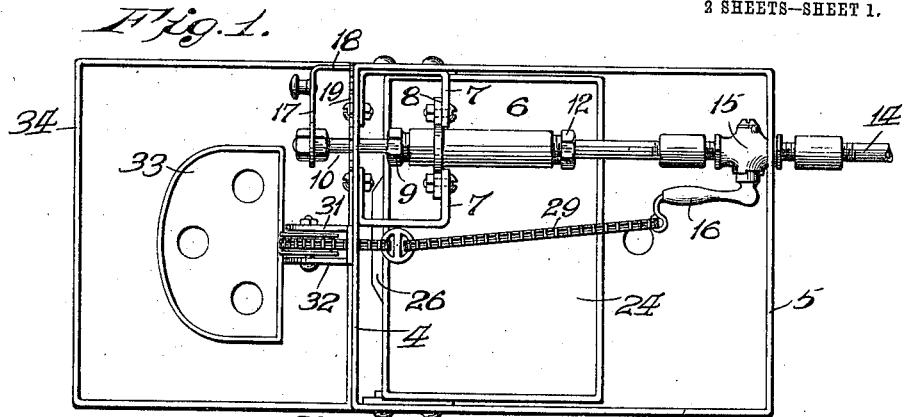
Figure 2:
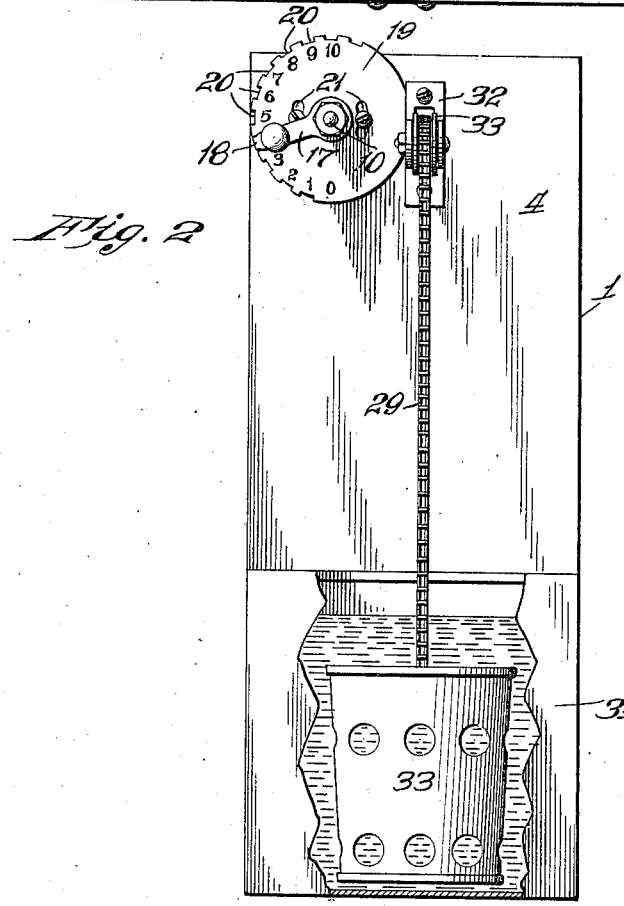

For the above purposes my invention consists in certain novel features of construction and arrangement of parts in an apparatus of this class as will be hereinafter fully described, pointed out in the claims and illustrated by the accompanying drawings, in which:

Figure 1 is a front of the complete apparatus; Fig. 2 is a front elevation of the apparatus with a portion of the front wall of the boiler broken away to illustrate the position of the egg container there-in. Fig. 3 is a vertical sectional elevation of the complete apparatus; Fig. 4 is an enlarged detail elevation of the valve and the lever for operating the same; and, Fig. 5 is a detailed sectional elevation taken on the line 5—5 of Fig. 3.

Referring by numerals to the accompanying drawings: 1 designates an open topped body portion of the apparatus, forming a chamber having supporting legs 2, drain pipe 3 and alining apertures adjacent its upper margin through the front and rear walls 4 and 5. The valve casing 6 is supported in the brackets 7 by the winged projections 8. An externally and internally threaded plug 9 is seated in the forward end of the valve casing and a threaded valve stem 10 is embraced by the plug. The inner end of the valve stem is reduced and arranged to be moved in relation to a perforated disk 11 inclosed in the valve casing, which disk is held in place by a threaded plug 12. An opening 13 is formed in the portion of the valve casing surrounding the reduced portion of the valve stem, a water supply pipe 14 is threaded to the plug 12 and projects through the aperture in the rear wall of the open top chamber, within the chamber and arranged on the pipe 14 is a cock 15 having a handle 16, the forward end of the valve stem 10 is passed through the aperture formed in the front wall of the chamber 1 and arranged to carry a lever 17 carrying an indicator 18.

A dial 19, having notches 20 formed in its periphery is movably secured to the front wall of the chamber 1 and embraces the valve stem 10. Consecutive numerals are formed on the face of the dial adjacent the notches 20 and slots 21 are formed in the dial, whereby the position of the dial may be changed as will be made clear hereafter.

A pair of brackets 22 are fixed within the chamber 1 to the side walls there-of and supported by a shaft 23 arranged to support a tilting water receptacle 24 by the bearing straps 25. To adjust the poise of the tilted water receptacle a lateral projection 26 is formed on the bearing strap 25 and engaged by a set screw 27 fixed in a bracket 28 on the front wall of the open top chamber. A chain 29, or other flexible member, is secured at its one end to the handle 16 on the water cock and to the top of the tilted receptacle 24 is passed through an opening 30 in the forward wall of the chamber 1 and rides over a pulley 31 alining with the opening 30 and supported in the brackets 32. The opposite end of the chain 29 is arranged to be secured to a basket 33 to suspend it in a boiler 34, the boiler being open topped and secured to the forward walls of the chamber 1 and projecting below the bottom of the chamber.

In the practical operation of the apparatus the boiler 34 is filled with water which is maintained at a boiling heat by means not shown, a number of eggs are then placed in the basket to be boiled. The time of boiling is determined by the position of the lever 17 and indicator 18 in relation to the dial 19. If it is desired to boil the eggs one minute only the lever is moved over the numeral one on the dial and the indicator seated in the corresponding notch, thus the movement of the lever 17 moves the inner end of the valve stem 10 away from the perforated disk 11 a sufficient distance to allow enough water within the water pipe 14 to flow through the disk into the valve casing and discharge through the opening 13 to fill the tilted receptacle in one minute.

The basket containing the eggs is then drawn to the position shown in solid lines of Fig. 3 within the boiling water contained in the boiler, as the basket is thus moved the water cock 15 is opened and the water permitted to flow as above stated. At the expiration of one minute the tilting water receptacle is filled with water and by reason of its being normally held in equipoise the weight of the water will cause it to over balance and move on its pivotal point, thereby lifting the basket containing the eggs out of the boiling water. The water contained in the tilting receptacle will be discharged into the chamber 1 and flow there-from through the drain pipe 3 to any suitable container. If it is desired to boil the eggs a greater length of time than one minute the indicator is moved by the lever 17 to the numeral on the dial indicating the time desired. The movement of the lever positioning the inner end of the valve stem in such relation to the perforated disk to allow a flow of water there-through as required to fill the tilted water receptacle in the time selected by the position of the indicator. If for any reason the timing becomes inaccurate, as might be caused by varying water pressures in the supply pipe or by reason of wear of the various parts, the dial may be adjusted to change the positions of the notches and numerals, thus changing the various positions of the inner end of the valve stem in relation to the perforated disk to apportion the amount of water flowing there-through in a given time.

I claim:

1. In an apparatus of the class described, a chamber, a water receptacle pivotally mounted within the chamber, a water supply pipe arranged to discharge water into said receptacle, a boiler adjacent the chamber, a basket, a flexible member connecting the water receptacle and basket, a valve located in the water supply pipe and a flexible member connecting the water receptacle and said valve.

2. In an apparatus of the class described, a chamber, a tilting water receptacle in said chamber, a boiler arranged adjacent said chamber, a basket, a flexible member connecting the basket and tilting water receptacle, a water supply pipe arranged to discharge water into said tilting receptacle, a valve carried by said water supply pipe, a flexible member connecting the tilting water receptacle with said valve, a second valve, a lever for operating said valve to govern the flow of water from the water supply pipe to the tilting receptacle and an indicator arranged adjacent said lever.

3. In an apparatus of the class described, a chamber, a tilting water receptacle mounted in said chamber, a water supply pipe arranged to discharge water into the tilting receptacle, a valve carried by said water supply pipe, a boiler, a basket, a flexible member connecting the basket, the tilting water receptacle and said valve, a perforated disk within the water supply pipe, a valve arranged to move longitudinally of the water supply pipe and to co-act with said perforated disk to regulate the flow of water through the water supply pipe, a lever for operating said second valve and a dial arranged adjacent said second valve.

4. In an apparatus of the class described, a chamber, a tilting water receptacle within said chamber, means for adjusting the poise of said tilting receptacle, a water supply pipe, a cut-off valve carried by said pipe, a valve housing, a perforated disk within said housing, a valve longitudinally movable through said housing, a lever carried by said second valve, a dial adjacent said lever, a boiler, a basket, a flexible connection between said basket and said tilting receptacle and a flexible connection between said tilting receptacle and said cut-off valve.

In testimony whereof, I have signed my name to this specification, in presence of two subscribing witnesses.

CHARLES S. KINNEY.

Witnesses:
E. E. LONGAN,
E. L. WALLACE.